United States Patent [19]
Siebers et al.

[11] Patent Number: 6,043,171
[45] Date of Patent: Mar. 28, 2000

[54] LEAD-FREE AND CADMIUM-FREE GLASS COMPOSITIONS FOR GLAZING, ENAMELING AND DECORATING GLASS OF GLASS-CERAMICS

[75] Inventors: Friedrich Siebers, Nierstein; Ottmar Becker, Langen; Waldemar Weinberg, Seibersbach; Petra Auchter-Krummel, Vendersheim, all of Germany

[73] Assignee: Schott Glas, Mainz, Germany

[21] Appl. No.: 09/081,468

[22] Filed: May 19, 1998

[30] Foreign Application Priority Data

May 24, 1997 [DE] Germany ............... 197 21 737

[51] Int. Cl.⁷ .................. C03C 8/02; C03C 8/14
[52] U.S. Cl. .................. 501/66; 501/21; 501/25; 501/26; 501/66; 501/67
[58] Field of Search .................. 501/17, 21, 25, 501/26, 66, 67, 69, 70

[56] References Cited

U.S. PATENT DOCUMENTS

| | | | |
|---|---|---|---|
| 5,200,369 | 4/1993 | Clifford et al | 501/67 |
| 5,326,728 | 7/1994 | Boury et al. | 501/21 |
| 5,447,891 | 9/1995 | Spinosa et al. | 501/21 |
| 5,605,869 | 2/1997 | Mangat et al. | 501/67 |
| 5,633,090 | 5/1997 | Rodek et al. | 501/67 |
| 5,849,649 | 12/1998 | Poole | 501/21 |

FOREIGN PATENT DOCUMENTS

| | | |
|---|---|---|
| 0 220 333 | 5/1987 | European Pat. Off. . |
| 0 220 333 B1 | 3/1990 | European Pat. Off. . |
| 0 509 792 A2 | 10/1992 | European Pat. Off. . |
| 42 41 411 A1 | 6/1994 | Germany . |
| 42 01 286 C2 | 11/1994 | Germany . |
| 195 12 847 C1 | 11/1996 | Germany . |

OTHER PUBLICATIONS

DIN 52 300, Entwurf, Apr. 1993.

*Primary Examiner*—Karl Group
*Attorney, Agent, or Firm*—Michael J. Striker

[57] ABSTRACT

The lead- and cadmium-free glass composition for glazing, enameling and decorating glass or glass-ceramic articles contains high quartz and/or keatite solid solution crystals as principal crystalline phases after crystallization and a low thermal expansion coefficient of less than $2 \times 10^{-6}/K$ at temperatures between 20 and 700° C. This glass composition contains $Li_2O$, 0 to 5% by weight; $Na_2O$, 0 to 5% by weight; $K_2O$, less than 2% by weight; MgO, 0 to 3% by weight; CaO, 0 to 4% by weight; SrO, 0 to 4% by weight; BaO, 0 to 4% by weight; ZnO, 0 to 4% by weight; $B_2O_3$, 15 to 27% by weight; $Al_2O_3$, 10 to 20% by weight; $SiO_2$, 43 to 58% by weight; $TiO_2$, 0 to 3% by weight and $ZrO_2$, 0 to 4% by weight, $Sb_2O_3$, 0 to 2% by weight; F, 0 to 3% by weight in exchange for oxygen and up to 30% by weight of at least one inorganic pigment resistant to a burning-in temperature on the glass or the glass-ceramics. The sum total amount of $Li_2O$, $Na_2O$ and $K_2O$ must be from 1 to 10% by weight. An average bending tensile strength of a glass-ceramic or glass article completely coated with the glass composition after burning-in is greater than 30 MPa.

11 Claims, 2 Drawing Sheets

LEAD-FREE AND CADMIUM-FREE GLASS COMPOSITIONS FOR GLAZING, ENAMELING AND DECORATING GLASS OF GLASS-CERAMICS

BACKGROUND OF THE INVENTION

The present invention concerns lead-free and cadmium-free glass compositions for glazing, enameling and decorating glass or glass-ceramics that contain high quartz and/or keatite solid solution crystals as a principal crystalline phase after crystallization and also concerns a method of making glass-ceramics provided with this glass composition.

Conventional glass-ceramics contain high quartz and/or keatite solid solution crystals as the principal crystalline phase, which are responsible for the low coefficient of thermal expansion. These glass-ceramics are transparent, translucent or opaque according to the crystalline phase and crystal size. The color is determined by the desired application and provided by means of oxide dyes. The principle fields of application of this type of glass-ceramic material with the lower thermal expansion include laboratory equipment, cooking vessels, fire protective glasses, chimney viewing windows and special heatable plates, e.g. cooking panels.

Decorative coatings are usually categorized as "glazes" and/or "enamels". The glazes generally include clear or colored glass (glass fluxes), while the enamels are coatings, which contain coloring, non-transparent materials, such as pigments. Colored inorganic compounds can be used as the pigments. The pigments usually may not react with glass flux or react only to a limited extent.

The glazes and enamels are used also for coating and improving glass-ceramics. Large-area coatings often are used for protection, covering or providing a pleasing appearance. Decorative glazes and enamels are used for writing for making a pleasing design or also for certain technical functions, such as in the case of display windows or markings of a cooking zone.

The glaze or enamel is burned-in at temperatures that are below the softening point of the article to be coated, so that the respective glass composition of the glaze or the enamel melts and forms a stable bond with the surface of the article. The burn-in temperature is generally below the softening point of the object to be coated so that no uncontrolled deformation can occur. The burning-in also acts to volatilize organic auxiliary substances, which, e.g., are used as suspension agents for the application of the glazes or enamels.

It is possible to find glazes or enamels with suitable coefficients of thermal expansion for glass or glass-ceramic coatings with thermal expansion coefficients of about $4\times10^{-6}$/K and greater. According to the state of the art it is desirable to use decorative coatings having a thermal expansion coefficient that is slightly less than that of the substrate to be coated. Because of that it is guaranteed that the glazes or the enamels turn out successfully on cooling after burning-in under pressure and exert no negative influences on the properties of the substrate, especially do not reduce the strength of the substrate. Stresses between the decorative coating and substrate build up when their thermal expansion coefficients do not match each other, so that cracks and tears arise, which can extend into the substrate material itself. The resulting stresses caused by the poor matching of the thermal expansion coefficients reduce the adherence of the coating. The decorative coating can immediately or in the course of time be worn off the substrate because of an especially poor match between the thermal expansion coefficients.

Problems arise in the current glaze or enamel decoration of glass-ceramics having a low thermal expansion based on high quartz or keatite solid solution crystals, which are made by thermal treatment, the so-called crystallization, of a suitable product glass. This type of glass-ceramics is characterized by a thermal expansion of less than $2\times10^{-6}$/K at temperatures between 20 and 700° C. The decoration usually occurs at temperatures under 1200° C. considering the softening point and the thermal resistance of these glass-ceramics. The burning-in of the glazes or enamels in the glass-ceramic material is preferably performed during the crystallization process, i.e. the decorative coatings are applied to the blank glass and burned-in during the crystallization. Currently no effective decorative coating with a matching thermal expansion coefficient is available for this type of glass-ceramic material with a low thermal expansion coefficient. Many attempts have been made to solve this problem of poor matching in order to avoid the occurrence of the serious disadvantages in the desired properties.

Especially the resulting reduction of the bending tensile strength occurring due to a complete-covering coating or heavily decorated surface is a serious disadvantage. The reduction of the bending tensile strength is based first on the unavoidable formation of stresses between the decoration and substrate due to the poor matching of thermal expansion coefficients and also because a certain amount of dissolving of the substrate by the decorative material and reaction at the surface is required for adherence of the decoration. It is possible to avoid the problem of reduction of bending tensile strength by using very light decorations, however complete-covering coatings for protection or heavy decorations, such as designs, are not possible. An average bending tensile strength of greater than 30 MPa is considered necessary for sufficient bending tensile strength in handling, formation and later use of the decorated glass-ceramics.

For example, the resulting stresses are reduced by using a decorative coating with reduced layer thickness, even with poor matching of the coefficients of thermal expansion. This means however that coloring properties (color coverage, color intensity) and protective action may be considerably reduced.

Glazes and enamels currently used for coating and/or for decoration of glass-ceramics with low thermal expansion coefficients frequently contain lead and also cadmium. Besides its beneficial effect in regard to a reduction of the burn-in temperature, the use of lead and cadmium provides a satisfactory adherence for the decorative coating, although the thermal expansion coefficient is in the size range of from $5\times10^{-6}$/K to up to $10\times10^{-6}$/K. The reason why this poor matching between the decorative coating and the glass-ceramic substrate can be tolerated, is ascribed to the plasticity of the remaining flux or enamel. Additives of lead and cadmium are thus beneficial for the strength of the decorated glass-ceramics and provide a comparatively good chemical resistance to weak acids and bases, such as commonly occur in the household, in food preparation or also as cleaning agents in industry.

In spite of these beneficial properties of the remaining coating today glazes and enamels may no longer contain lead and cadmium because of the undesirable toxicological properties of these elements. In the literature different paths are already being suggested to coat glass-ceramics with low thermal expansion coefficients without using lead or cadmium compounds.

In German Patent Document DE 42 41 411 A1 an attempt to solve the problem of poor matching between the glass-ceramic substrate and decorative coating by addition of chemically inert, optically inactive, elastic inorganic materials was described. This type of additive comprises, e.g., mica platelets, which provide a certain plasticity to the decorative coating. Adherent and wear-resistant decorative coatings were made using these additives. However the effect of these additives used to make these coatings on the color shade and reflectivity of the coating is not always desirable and therefore disadvantageous.

German Patent Document DE 42 01 286 C2 describes the use of lead-free and cadmium-free glass compositions for glazes and enamels used on glass and glass-ceramics with a thermal expansion coefficient of less than $5.0 \times 10^{-6}$/K. The composition described in this reference contains $Li_2O$, 0 to 12% by weight; MgO, 0 to 10% by weight; CaO, 3 to 18% by weight; $B_2O_3$, 5 to 25% by weight; $Al_2O_3$, 3 to 18% by weight; $Na_2O$, 3 to 18 % by weight; $K_2O$, 3 to 18% by weight; BaO, 0 to 12% by weight; $SiO_2$, 25 to 55% by weight, $TiO_2$, 0 to 5% by weight and $ZrO_2$, 0 to <3% by weight. The relatively high content of alkaline and alkaline earth metal oxides, here especially $K_2O$ and CaO, provides the good adherence of the resulting decorative coatings. The high alkali and alkaline earth oxide content effects chemical resistance to acids and strength of the glass-ceramic material disadvantageously.

U.S. Pat. No. 5,326,728 claims a lead-free frit containing $SiO_2$, 35 to 50% by weight; $B_2O_3$, 23 to 30% by weight; $Al_2O_3$, 10 to 22% by weight; $Li_2O$, 1 to 3% by weight; $Na_2O$, 0 to 3% by weight; $K_2O$, 2 to 5% by weight; CaO, 1 to 5% by weight; $TiO_2$, 0 to 2% by weight and $ZrO_2$, 0 to 5% by weight, wherein the total sum of the $Li_2O$, $Na_2O$ and $K_2O$ present is less than 8% by weight and the total amount of CaO, MgO, ZnO, BaO and SrO present is less than 7% by weight. Additives of $K_2O$ and CaO are required in this composition in order to achieve sufficient adherence in spite of the poor matching. For high requirements for acid resistance and strength of the decorative glass-ceramic coating these compositions are however often insufficient.

Especially the presence of $K_2O$ in amounts of >2% by weight has proven to be extremely deleterious for the bending tensile strength of the decorated glass-ceramic material. The potassium atom is very mobile during burning-in of the decoration and reaches the vicinity of the surface layer between the glass ceramic substrate and the decorative coating. This produces additional stresses that definitely reduce the bending tensile strength. The presence of $K_2O$ in amounts of 2% by weight and larger occurs indeed results in the use of lighter decorative embodiments. Complete-covering coatings for protection or heavy decorative layers desirable for esthetically pleasing designs are thus only obtained to a limited extent.

SUMMARY OF THE INVENTION

It is an object of the present invention to provide lead-free and cadmium-free glass compositions for glasses, enamels and decoration of glass or glass-ceramics, which contain high quartz and/or keatite solid solution crystals and having a low thermal expansion coefficient of less than $2 \times 10^{-6}$/K and which meets all the requirements for these materials.

It is another object of the present invention to provide lead-free and cadmium-free glass compositions that can be processed in a low and comparatively wide temperature range without any problems and to thus provide glazes and enamels that have very good properties for industrial and household uses, especially good adherence, chemical resistance to acid and alkali, appearance, wear-resistance and defect insensitivity.

It is a further object of the invention to provide a method of making glass-ceramics decorated with the glass composition of the invention which have a high strength.

According to the invention the lead-free and cadmium-free glass compositions for glazing, enameling and decorating glass or glass-ceramics contain high quartz and/or keatite solid solution crystals as the principal crystalline phase or phases after crystallization and have a low thermal expansion coefficient of less than $2 \times 10^{-6}$/K at temperatures between 20 and 700° C. The glass compositions according to the invention contain $Li_2O$, 0 to 5% by weight; $Na_2O$, 0 to 5% by weight; $K_2O$, less than 2% by weight; MgO, 0 to 3% by weight; CaO, 0 to 4% by weight; SrO, 0 to 4% by weight; BaO, 0 to 4% by weight; ZnO, 0 to 4% by weight; $B_2O_3$, 15 to 27% by weight; $Al_2O_3$, 10 to 20% by weight; $SiO_2$, 43 to 58% by weight; $TiO_2$, 0 to 3% by weight and $ZrO_2$, 0 to 4% by weight, $Sb_2O_3$, 0 to 2% by weight; F, 0 to 3% by weight in exchange for oxygen and up to 30% by weight of at least one inorganic pigment resistant to a burning-in temperature on the glass or the glass-ceramics. The sum total amount of $Li_2O$, $Na_2O$ and $K_2$ present must be from 1 to 10% by weight. An average bending tensile strength of a glass-ceramic or glass article completely coated with the glass composition according to the invention is greater than 30 MPa after burning-in.

A particularly preferred embodiment of the glass compositions of the invention contains 1 to 4% by weight of the $Li_2O$; from 0 to 3% by weight of the $Na_2O$; less than 2% by weight of the $K_2O$; from 0 to 3% by weight of the MgO; from 0 to 3% by weight of the CaO; from 0 to 4% by weight of the SrO; from 0 to 3% by weight of the BaO; from 0 to 3% by weight of the ZnO; from 15 to 23% by weight of the $B_2O_3$; from 14 to 19% by weight of the $Al_2O_3$; from 48 to 57% by weight of the $SiO_2$; from 0 to 3% by weight of the $TiO_2$ and from 0 to 3% by weight of the $ZrO_2$, from 0 to 1% by weight of the $Sb_2O_3$ and the F is 0 to 2% by weight in exchange for oxygen. In this embodiment a sum total amount of the MgO, CaO, SrO and BaO present is from 1 to 9% by weight and the sum total amount of the $Li_2O$, $Na_2O$ and $K_2O$ present is from 2 to 7% by weight.

It has been shown that the glass compositions according to the invention have properties of lead oxide and cadmium oxide containing glass compositions, especially the adherence properties, the chemical resistance and strength properties. The bending tensile strength of glass-ceramics decorated with the glass compositions of the invention after burning-in attain values of greater than 30 MPa. Moreover they have the additional advantage of reduced sensitivity to defects caused by contamination. Viscosity lowering components, such as alkali, $B_2O_3$, and, if necessary, alkaline earths, ZnO and F, are combined in comparatively narrow limits with oxides, which participate in the formation of the glass network, especially $SiO_2$, $Al_2O_3$, and if necessary with reduced amounts of $TiO_2$, $ZrO_2$, $La_2O_3$, $SnO_2$, $Bi_2O_3$ or $P_2O_5$.

The sum total amount of the alkali oxides should be between 1 and 10% by weight in the glass composition of the invention. The addition of alkali is required in order to achieve the desired low burn-in temperature. Besides the viscosity lowering effect the alkalis are also responsible to a large measure for the shiny appearance of the applied decorative layer. Higher alkali content diminishes the acid resistance of the applied layer. Also higher alkali content has a negative effect on the strength of the coated glass-ceramics. The $Li_2O$ and $Na_2O$ content should be limited to 5% by weight each. The $K_2O$ content must be kept under 2% by weight. $K_2O$ is beneficial for the adherence of the applied decorative coating, but less effective in regard to lowering of the viscosity. Particularly a high $K_2O$ content has a negative effect of the strength of the decorated ceramics. Thus preferably the $Li_2O$ should be from 1 to 4% by weight and the $Na_2O$ from 0 to 3% by weight, while the total alkali oxide content should be from 2 to 7% by weight.

The $B_2O_3$ content in the glass compositions of the invention is between 15 to 27% by weight. The $B_2O_3$ addition is required to stabilize the glass melt in regard to undesirable devitrification. The $B_2O_3$ lowers the viscosity of the glass and allows the burning-in at lower temperatures. The $B_2O_3$ influences the appearance in a positive manner. The acid resistance of the coating deteriorates with a $B_2O_3$ content higher than 27% by weight. A content of $B_2O_3$ lower than 15% by weight leads to poor viscosity properties. Especially good properties are obtained when the glass composition contains from 15 to 23% by weight.

$SiO_2$ and $Al_2O_3$ are the main ingredients of the glass compositions of the invention. $SiO_2$ as a network former is responsible for the stability, the chemical resistance and the strength. The $SiO_2$ content is between 43 and 58% by weight. A higher $SiO_2$ content is not beneficial because of its viscosity raising action and prevents the smooth flow of the layer during its burning-in. An $SiO_2$ content less than 43% by weight reduces the acid resistance to much. An $SiO_2$ content between 48 and 57% by weight which is particularly beneficial for the strength of the decorated glass-ceramic is preferred. An $Al_2O_3$ content between 10 and 20% by weight provides stability to the glass and improves the wear-resistance and strength of the decorated glass-ceramics. A higher content than 20% by weight however increases the viscosity impermissibly and the shiny appearance deteriorates. An $Al_2O_3$ content less than 10% by weight leads to insufficient strength values. Especially good properties are obtained with the glass composition according to the invention has an $Al_2O_3$ content between 14 and 19% by weight.

Additives of alkaline earth oxides assist the viscosity lowering action of the alkalis. A maximum of 3% by weight MgO, a maximum of 4% by weight CaO and a maximum of 4% by weight SrO and BaO each are permitted as additives. When the stated upper limits are exceeded, the acid resistance and strength deteriorate in an impermissible manner. Preferably the sum total amount of the alkaline earths present amounts to from 1 to 9% by weight.

The glass composition can contain up to a maximum of 4 % by weight ZnO to improve the viscosity properties and wear-resistance. A higher content of ZnO leads to a deterioration of the strength.

$Sb_2O_3$-additives are permitted up to 2% by weight and provide adherence properties to the decorative coating. Larger amounts are toxicologically undesirable and reduce the acid resistance.

The glass can also contain $TiO_2$ between 0 to 3% by weight to improve the acid resistance. Larger amounts of $TiO_2$ impair the stability of the glass. $ZrO_2$ can be contained in amounts up to 4% by weight, preferably up to 3% by weight. The chemical resistance to alkali and strength of the decorated glass-ceramics is improved by $ZrO_2$-additives. Larger amounts of $ZrO_2$ reduce the wear-resistance and endanger the stability of the glass to devitrification.

The glass can contain additional fluorine additives in amounts of up to 3% by weight, preferably up to 2% by weight. The addition of fluorine reduces the viscosity and thus the firing temperature. Fluorine ions replace the corresponding amount of oxygen anion is in the glass network. A larger amount of fluorine reduces the acid resistance of the glass. Also $Bi_2O_3$, $La_2O_3$, $SnO_2$, and $P_2O_5$ can be present as additives in the glass. The maximum amount of the individual oxides should not exceed 3% by weight. Several of these oxides can be used together, but the sum of the amounts of these oxides should not exceed 5% by weight. $SnO_2$ additives improve the chemical stability but lead to an increase in the viscosity. $Bi_2O_3$, $La_2O_3$ and $P_2O_5$ improve the fusability, but higher contents endanger however the vitrification stability and the chemical resistance.

Glass powder made from the glass composition according to the invention can be mixed without difficulty with one or more inorganic pigments up to about 30% by weight of the pigment and then used to make colored coatings, enamels and/or decorations. Inorganic materials, which are substantially stable in regard to their composition at the burning-in temperature, are used as the inorganic pigments. Colored oxides can be added which dissolve in the glass to provide a color, however the glazes can be colored in themselves.

The glass compositions according to the invention are first homogeneously melted and a glass powder with an average grain size of <10 $\mu$m, preferably <5 $\mu$m, is then made by grinding the glass formed from the melt. The glass-ceramic to be decorated is then coated starting with the glass powder so obtained, if necessary after addition of suitable inorganic pigments. Generally during the coating known methods are used, such as, e.g., dipping, spraying, screen printing and so forth. The processing occurs with addition of organic auxiliary substances and/or suspension agents. For example, the powder is mixed with a screen printing oil during screen printing, the paste is homogenized with a three roll mill and then applied in a direct screen printing or after a metachromotype process (indirect screen printing). Alternatively mixing with thermoplastic auxiliary substances permits screen printing with heating. Layers are obtained whose thickness is between 2 and 9 $\mu$m, after burning-in on the glass-ceramics to be decorated. The glass-ceramics to be decorated are advantageously present in a glassy initial state. The burning-in of the glaze and/or enamel layers is preferably performed during the crystallization processes. The composition of the glass-ceramics to be coated and the crystallization process are described in the literature, e.g. in European Patent Document EP 220 333 B1. The crystallization occurs in temperature ranges for 800 to 950° C. and 900 to 1200° C. respectively according to whether high quartz or keatite solid solution crystals should be present as the main crystalline phase. A nuclei formation step at temperatures of from 650 to 800° C. is performed prior to crystallization in order to obtain sufficient crystal density. Especially good properties of the glass-ceramics made from the glass compositions according to the invention are obtained when glass compositions are selected whose transformation, softening and processing temperatures are clearly higher than the current state of the art glass compositions. Thus the transformation temperatures (Tg) are from 450 to 650° C., especially from 490 to 590° C., the softening temperature ($E_W$) is from 600 to 850° C., especially from 640 to 800° C., and the processing temperatures ($V_A$) are from 880 to 1150° C., especially from 900 to 1120° C. The thermal expansion coefficient α is $3.5 \times 10^{-6}$/K to $7 \times 10^{-6}$/K, preferably from $4 \times 10^{-6}$/K to $6 \times 10^{-6}$/K, between 20 to 300° C. The comparatively high temperatures for Tg, $E_W$ and $V_A$ provides beneficial improvements in the thermal resistance of the decorating coating. After 75 hours at 670° C. practically no visual color changes occur.

Glass-ceramic substrate decorative coatings were made with the glass compositions according to the invention, which correspond to the current PbO- and CdO-containing glasses in regard to appearance and wear-resistance. The glass compositions according to the invention are even better than the conventional PbO- and CdO-containing glasses in regard to heat resistance and defect insensitivity. The outstanding adherence properties of the glasses of the invention, in spite of the very large difference in the thermal expansion of the decorative coating and the glass-ceramic substrate, are particularly advantageous. The glasses of the invention also have good chemical resistance and the glass-ceramics coated with them have great strength. Glass-ceramic products whose surface is completely covered by a decoration made with the glass compositions of the invention have a bending tensile strength greater than 30 MPa after burn-in. No peeling off of the decorative layer from the glass ceramics occurs with the larger layer thicknesses, e.g. up to 9 μm, even with a temperature shock, whereby the large thermal expansion difference between the decorative coating and glass-ceramic is tolerated. This good adherence is retained for comparatively longer times in practical applications, connected with extreme temperature changes. The chemical resistance and here especially the resistance to acids is advantageous in comparison to the current lead-free compositions. The strength of the glass-ceramic articles coated with the glass compositions according to the invention is especially clearly improved for heavy decorative layering in contrast to the current lead-free compositions.

BRIEF DESCRIPTION OF THE DRAWINGS

The objects, features and advantages of the invention will be explained in more detail with the aid of the following examples, with reference to the following figures.

EXAMPLE

Figure 1:
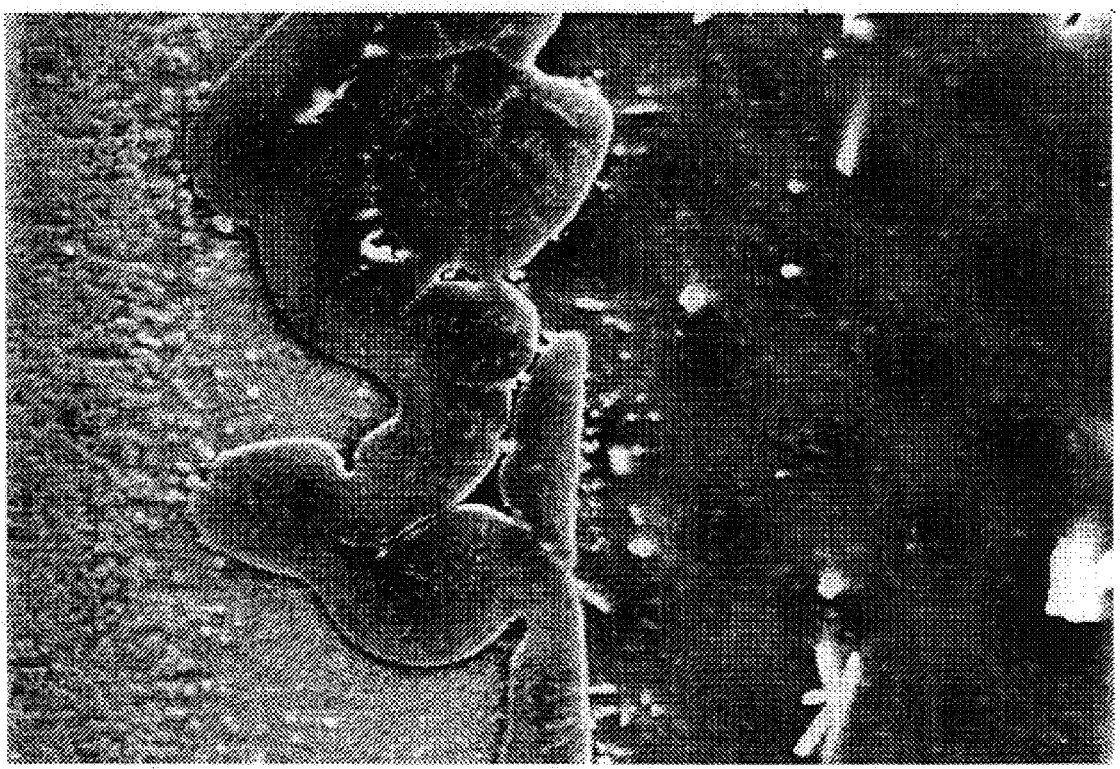
FIG. 1 is an SEM-cross-section of Pb-free and K- and Ca-containing decorative glass composition Nr. 16 of the examples below baked on an LAS glass-ceramic article.

Table 1 contains 16 examples of glass compositions with the amounts of the various ingredients expressed in weight% together with measured properties of each composition, which characterize the viscosity, including the transformation temperature (Tg in °C.), the processing temperature ($V_A$ in °C.), the thermal expansion coefficient (in $10^{-6}$/K between 200 and 300° C. and the density in g/cm³. Examples 15 and 16 fall outside of the composition ranges for the compositions according to the invention and are thus comparative examples.

TABLE I

GLASS COMPOSITIONS AND PROPERTIES

| Glass # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $Li_2O$ | 3.1 | 2.0 | 4.0 | 4.0 | 2.0 | 3.5 | 3.0 | 3.0 | 3.1 | 2.8 | 3.0 | 3.0 | 3.0 | 3.0 | — | 2.8 |
| $Na_2O$ | 1.0 | 3.0 | — | 3.0 | 4.0 | 0.5 | 0.5 | 1.0 | — | 1.5 | 0.5 | 1.0 | — | — | 1.6 | 1.8 |
| $K_2O$ | 1.0 | — | 1.5 | 0.0 | — | 1.0 | — | — | — | — | — | — | — | — | 7.2 | 12.0 |
| MgO | 0.4 | — | — | 1.0 | 1.0 | 1.0 | 1.8 | 1.5 | 1.7 | 0.4 | 1.0 | 1.5 | 1.5 | 1.5 | — | — |
| CaO | — | — | 2.0 | 2.0 | 2.0 | — | 1.0 | 1.6 | 2.0 | — | 1.0 | 2.0 | 1.5 | 2.0 | 3.6 | 4.5 |
| SrO | 1.0 | 2.0 | — | — | — | 0.5 | 1.8 | 2.0 | 2.3 | — | — | — | 2.0 | 2.0 | — | — |
| BaO | — | — | — | — | — | — | — | — | — | 3.7 | 3.0 | 1.0 | — | — | — | — |
| ZnO | 1.4 | 2.0 | — | 2.0 | — | 1.5 | 1.4 | 2.0 | 2.2 | 1.0 | 1.0 | 2.0 | 2.0 | 2.2 | 1.5 | — |
| $B_2O_3$ | 17.5 | 22.5 | 24.5 | 19.0 | 19.0 | 23.0 | 17.2 | 17.0 | 16.7 | 17.3 | 17.0 | 17.5 | 17.0 | 16.8 | 24.4 | 21.8 |
| $Al_2O_3$ | 17.5 | 11.5 | 11.0 | 12.5 | 19.0 | 18.0 | 17.5 | 17.7 | 16.6 | 17.1 | 17.0 | 16.0 | 17.0 | 15.5 | 17.5 | 7.5 |
| $La_2O_3$ | — | — | — | — | — | — | — | — | — | — | — | 0.5 | — | — | — | — |
| $Bi_2O_3$ | — | — | — | — | — | — | — | — | — | — | — | — | — | 2.0 | — | — |
| $SiO_2$ | 54.0 | 53.0 | 55.0 | 55.0 | 51.0 | 50.0 | 53.7 | 53.2 | 54.0 | 52.0 | 53.3 | 53.0 | 52.0 | 53.0 | 42.2 | 49.6 |
| $TiO_2$ | 1.9 | 2.0 | 2.0 | 1.0 | 2.0 | 1.0 | 1.4 | — | — | 1.9 | — | — | — | — | — | — |
| $ZrO_2$ | 1.2 | — | — | 0.5 | — | — | 0.7 | 1.0 | 1.1 | 1.0 | 1.0 | 1.0 | 1.0 | 1.0 | 2.0 | — |
| $SnO_2$ | — | — | — | — | — | — | — | — | — | — | — | 1.5 | — | — | — | — |
| $P_2O_5$ | — | — | — | — | — | — | — | — | — | — | — | — | 2.0 | — | — | — |
| $Sb_2O_3$ | — | 2.0 | — | — | — | — | — | — | 1.3 | — | — | — | — | — | — | — |
| F | — | — | — | — | — | — | — | — | — | — | — | 2.0 | — | 1.0 | 1.0 | — | — |
| Tg (° C.) | 525 | 497 | 507 | 509 | 533 | 515 | 561 | 561 | 578 | 529 | 509 | 539 | 523 | 523 | 541 | 507 |

TABLE I-continued

GLASS COMPOSITIONS AND PROPERTIES

| Glass # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $E_W$ (° C.) | 781 | 679 | 660 | 655 | 741 | 706 | 760 | 745 | 755 | 765 | 732 | 724 | 730 | 716 | 762 | 629 |
| $V_A$ (° C.) | 1049 | 978 | 923 | 914 | 1062 | 1021 | 1069 | 1060 | 1064 | 1081 | 1076 | 1024 | 1062 | 1027 | 1069 | 828 |
| $\alpha$ ($10^{-6}$/K) | 4.58 | 4.95 | 4.89 | 5.65 | 5.18 | 4.73 | 4.37 | 4.67 | 4.41 | 4.86 | 4.42 | 4.68 | 4.30 | 4.44 | 5.89 | 8.17 |
| Density, g/cm$^3$ | 2.341 | 2.347 | 2.289 | 2.396 | 2.335 | 2.301 | 2.378 | 2.398 | 2.408 | 2.399 | 2.370 | 2.414 | 2.378 | 2.440 | 2.343 | * |

*not determined

The glasses according to examples 1 to 16 were ground to powders with an average grain size of from 1 to 3 μm. The powder so obtained is mixed with inorganic pigments according to Table 2 and worked up to a screen printing paste by addition of screen printing oil in a pine oil base. Viscosities between 1 and 5 Pa.s were measured with a Brookfield-Rheometer. Initial glasses (according to EP 220 333 B1) convertible to glass-ceramics with the pastes so obtained were printed. The screen printing performed provided both different decorative examples and printed test patterns covering the entire surface. A screen of mesh size 150 T was used. The coatings were burned in a continuous manufacturing oven or a laboratory oven. The crystallization of the initial glass into a glass-ceramic produced a glass-ceramic with high quartz as the crystalline phase in the case of test runs 1 to 16 or with keatite solid solution crystals as the crystalline phase in the case of test runs 17 to 20. The maximum temperatures reached during burning-in or baking are tabulated in Table 2. The coatings have a layer thickness of about 4 μm after burning-in and crystallization. The measured properties are tabulated in Table 2. The adherence strength is tested for a decorative test pattern that completely covers the surface. The burned-in decorative layer is pressed on a strip of transparent adhesive film (Tesafilm® Type 104, from Beiersdorf). The strip is rubbed firmly and then torn away. After that a decision is made regarding how many particles from the coating adhere to the strip. The value 0 means that no particles adhere to the strip, the value 1 means that only a few particles adhere to the strip, which is not critical for practical applications, the value 2 means a larger number of particles adhere to the strip, the value 3 means the decorative layer is removed by the strip.

The acid resistance is measured according to a similar scheme using visual color changes. The value 0 means no detectable reaction, the value 1 means very slight reaction, not critical, the value 2 means notable reaction, the value 3 means extensive reaction and the value 4 means a complete change of the decorative coating. The test was performed with 4% acetic acid at its boiling temperature for 4 hr. This test method provides a comparatively strong attack in order to be able to state that the articles meet the highest requirements for acid resistance.

The strength is tested in a 100×100 mm decorative test pattern with a printed completely covering central 50×50 square shape. The bending tensile strength was measured according to the twin ring method (DIN 52300, Part 5). The bending tensile strength was measured for at least 12 test patterns for each coating. The average values for the twelve are tabulated in Table 2.

The measured values in Table 2 show that the glass compositions according to the invention have both good adherence strength, good acid resistance and comparatively high bending tensile strength (>30 MPa). This combination is not achieved with the comparative compositions. The named properties approach those of PbO- and/or CdO-containing glazes and enamels. However the compositions according to the invention have clearly improved defect insensitivity and heat resistance in comparison to them. Also appearance, wear behavior, resistance to basic cleaning agents and cleaning properties show according to known standard methods that the glass compositions according to the invention are outstanding substitutes for the PbO- and CdO-containing glasses.

A scanning electron micrograph (SEM) of the region between the decorative glass coating on a glass-ceramic was taken to show the structure of the transitional region between the coating and the glass-ceramic. This SEM-cross-section is shown in FIG. 1 for the Pb-free, K- and Ca-containing decorative glass Nr. 16. The test sample was etched to show the difference between the crystalline and glass regions. The etching was performed with 0.2% HF for 10 sec.

Figure 2:
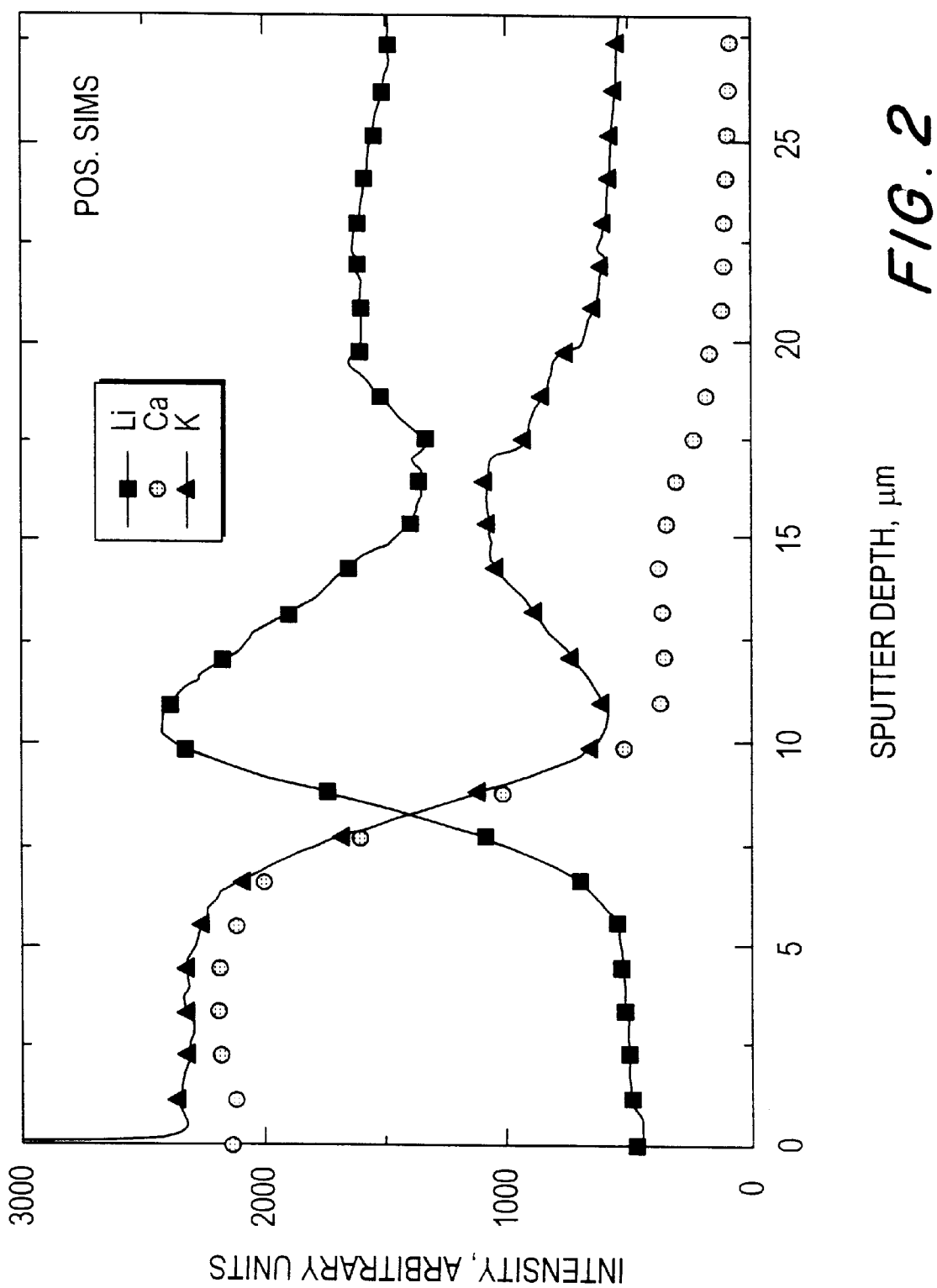
FIG. 2 is a graphical illustration showing the relationship of intensity to sputter depth for a Li-, Ca- and K-SIMS depth profile of the decorative glass of FIG. 1.

A corresponding SIMS depth profile for Li, Ca and K was also taken of the same test sample of FIG. 1. This SIMS depth profile in FIG. 2 clearly shows that the K is clearly enriched while Ca is only weakly increased.

TABLE II

PREPARATION AN PROPERTIES OF GLAZES AND ENAMELS

| Test # | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Glass # | 1 | 2 | 3 | 4 | 5 | 6 | 7 | 8 | 9 | 10 | 11 | 12 | 13 | 14 | 15 | 16 | 5 | 8 | 12 | 14 |
| Pigment added, % by weight | wl/ 20 | wl/ 20 | wl/ 20 | wl/ 20 | wl/ 20 | wl/ 20 | wl/ 20 | wl/ 20 | wl/ 20 | wl/ 20 | none — | brn/ 20 | blu/ 20 | bla/ 20 | wl/ 20 | brn/ 20 | none — | brn/ 15 | brn/ 20 | bla/ 20 |
| Burn-in temperature, °C. | 885 | 885 | 885 | 885 | 885 | 885 | 885 | 885 | 885 | 885 | 885 | 885 | 885 | 885 | 885 | 885 | 1100 | 1100 | 1100 | 1100 |
| adherence strength | 0 | 1 | 1 | 0 | 0 | 1 | 1 | 1 | 1 | 1 | 0 | 0 | 0 | 0 | 0 | 0 | 0 | 0 | 0 | 0 |
| acid resistance, 4%, acetic acid | 0 | 0 | 0 | 0 | 0 | 0 | 0 | 0 | 1 | 1 | 1 | 0 | 2 | 0 | 3 | 0 | 0 | 0 | 1 | 0 |
| Bending strength, MPa | 34 | 35 | 33 | 35 | 33 | 33 | 33 | 33 | 32 | 37 | 41 | 39 | 39 | 50 | 27 | 21 | 67 | 62 | 92 | 93 |

The inorganic pigments used in table in the compositions of the invention include the following: white $TiO_2$ pigment, RKB-6, from Bayer("w1" in Table 2 above); white $TiO_2$ pigment, RM 461, from Cookson-Matthey(w2); blue RM 670, from Cookson-Matthey("blu" in Table 2 above); black RM 658, from Cookson-Matthey("bla" in Table 2 above); brown, Spinell, 26456, from Cerdec ("brn" in Table 2 above).

The disclosure of German Patent Application 197 21 737.0 of May 24, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in lead-free and cadmium-free glass compositions for glazing, enameling and decorating glass or glass-ceramics, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A lead-free and cadmium-free glass composition for glazing, enameling and decorating glass or glass-ceramics containing high quartz and/or keatite solid solution crystals as principal crystalline phases after crystallization and having a thermal expansion coefficient of less than $2 \times 10^{-6}/K$ at temperatures between 20 and 700°C., wherein the glass composition contains $Li_2O$, 0 to 5% by weight; $Na_2O$, 0 to 5% by weight; $K_2O$, less than 2% by weight; MgO, 0 to 3 by weight; CaO, 0 to 4% by weight; SrO, 0 to 4% by weight; BaO, 0 to 4% by weight; ZnO, 0 to 4% by weight; $B_2O_3$, 15 to 27% by weight; $Al_2O_3$, 10 to 20% by weight; $SiO_2$, 43 to 58% by weight; $TiO_2$, 0 to 3% by weight; $ZrO_2$, 0 to 4% by weight, $Sb_2O_3$, 0 to 2% by weight; F, 0 to 3% by weight in exchange for oxygen and up to 30% by weight of at least one inorganic pigment resistant to a burning-in temperature on the glass or the glass-ceramics; and wherein a sum total amount of the $Li_2O$, $Na_2O$ and $K_2O$ present is from 1 to 10% by weight;

whereby an average bending tensile strength of a glass-ceramics article completely coated with said glass composition is greater than 30 MPa after burning or baking the glass composition into the glass-ceramics article.

2. The lead-free and cadmium-free glass composition as defined in claim 1, containing from 1 to 4% by weight of the $Li_2O$; from 0 to 3% by weight of the $Na_2O$; less than 2% by weight of the $K_2O$; from 0 to 3% by weight of the MgO; from 0 to 3% by weight of the CaO; from 0 to 4% by weight of the SrO; from 0 to 3% by weight of the BaO; from 0 to 3% by weight of the ZnO; from 15 to 23% by weight of the $B_2O_3$; from 14 to 19% by weight of the $Al_2O_3$; from 48 to 57% by weight of the $SiO_2$; from 0 to 3% by weight of the $TiO_2$ and from 0 to 3% by weight of the $ZrO_2$, from 0 to 1% by weight of the $Sb_2O_3$ and the F is 0 to 2% by weight in exchange for oxygen; and wherein a sum total amount of the MgO, CaO, SrO and BaO present is from 1 to 9% by weight; and wherein the sum total amount of the $Li_2O$, $Na_2O$, $K_2O$ present is from 2 to 7% by weight.

3. The glass composition as defined in claim 1, containing up to 3% by weight of each of one or more of $Bi_2O_3$, $La_2O_3$, $SnO_2$ and $P_2O_5$, but wherein a sum total amount of said $Bi_2O_3$, $La_2O_3$, $SnO_2$ and $P_2O_5$ present is less than 5% by weight.

4. The glass composition as defined in claim 3, wherein a sum total amount of the MgO, CaO, SrO and BaO present is from 1 to 7% by weight, a sum total amount of the $Li_2O$, $Na_2O$, $K_2O$ and F present is from 2 to 7% by weight and a sum total amount of the $Al_2O_3$, $SiO_2$, $TiO_2$, $ZrO_2$, $Bi_2O_3$, $La_2O_3$, $SnO_2$ and $P_2O_5$ present is 64 to 75% by weight.

5. The glass composition as defined in claim 1, having a transformation temperature (Tg) from 450° C. to 650° C., a softening temperature ($E_W$) from 600° C. to 850° C., a processing temperature ($V_A$) from 880° C. to 1150° C. and a thermal expansion coefficient ($\alpha$) of $3.5 \times 10^{-6}$ to $7 \times 10^{-6}/K$ between 20° C. to 300° C.

6. The glass composition as defined in claim 5, wherein said thermal expansion coefficient is from $4 \times 10^{-6}/K$ to $6 \times 10^{-6}/K$, said transformation temperature is from 490° C. to 590° C., said processing temperature is from 900° C. to 1120° C. and said softening temperature is from 640° C. to 800° C.

7. The glass composition as defined in claim 1, comprising a powder with a grain size of less than 10 μm.

8. The glass composition as defined in claim 7, wherein said grain size is less than 5 μm.

9. The glass composition as define in claim 1, wherein a layer thickness thereof on the glass-ceramic article after the burning-in is less than 9 μm.

10. The glass composition as define in claim 1, wherein a layer thickness thereof on the glass-ceramic article after the burning-in is from 2 to 7 μm.

11. A process of making a glazed, enameled or decorated glass-ceramic article, said process comprising burning-in the glazed layer, the enameled layer or the decorated layer made with the glass composition as defined in claim 1 together during a crystallization process for the glass-ceramic article.

* * * * *